United States Patent [19]
Becker

[11] Patent Number: 4,798,422
[45] Date of Patent: Jan. 17, 1989

[54] HYDRAULIC BRAKE SYSTEM FOR AUTOMOTIVE VEHICLES

[75] Inventor: Horst P. Becker, Frankfurt am Main, Fed. Rep. of Germany

[73] Assignee: Alfred Teves GmbH, Frankfurt am Main, Fed. Rep. of Germany

[21] Appl. No.: 63,619

[22] Filed: Jun. 17, 1987

[30] Foreign Application Priority Data

Jul. 4, 1986 [DE] Fed. Rep. of Germany ....... 3622556

[51] Int. Cl.$^4$ .............................................. B60T 8/32
[52] U.S. Cl. ..................................... 303/115; 303/113
[58] Field of Search .............. 303/113, 114, 116, 117, 303/119

[56] References Cited

U.S. PATENT DOCUMENTS

| | | | |
|---|---|---|---|
| 4,050,748 | 9/1977 | Belart | 303/114 |
| 4,346,944 | 8/1982 | Leiber | 303/119 |
| 4,354,714 | 10/1982 | Belart | 303/119 X |
| 4,395,072 | 7/1983 | Belart | 303/116 X |
| 4,421,361 | 12/1983 | Arikawa et al. | 303/116 X |
| 4,653,814 | 3/1987 | Burgdorf | 303/114 X |
| 4,708,407 | 11/1987 | Maehara | 303/116 |

FOREIGN PATENT DOCUMENTS 3439271 4/1986 Fed. Rep. of Germany ...... 303/116

Primary Examiner—Andres Kashnikow
Assistant Examiner—Matthew C. Graham
Attorney, Agent, or Firm—James B. Raden

[57] ABSTRACT

In a brake system, two groups of wheel brakes (17, 18) and a brake valve (12) for controlling the initial pressure of a pump (24) are connected to the two brake lines (10, 15; 11, 16) of a tandem master cylinder (1). Through the brake valve (12), the flow of delivery of the pump (24), is restricted in response to the pressure in the brake conduits (10, 11), thereby generating, in a pressure conduit (26) in communication with the pump outlet, a pressure proportional to the master cylinder pressure and, through check valves (31, 32), being fed into the brake conduits (15, 16) leading to the wheel brakes (17, 18). The pump outlet (26), moreover, through a pressure conduit (33), is in communication with a reserve pressure chamber (34) separated through a piston (35) from the working chamber (6) of the tandem master cylinder (1). Upon failure of the pressure fluid supply through pump (24), the pressure fluid required for applying the brake can be displaced from the reserve pressure chamber (34) by applying the brake pedal (2).

1 Claim, 1 Drawing Sheet

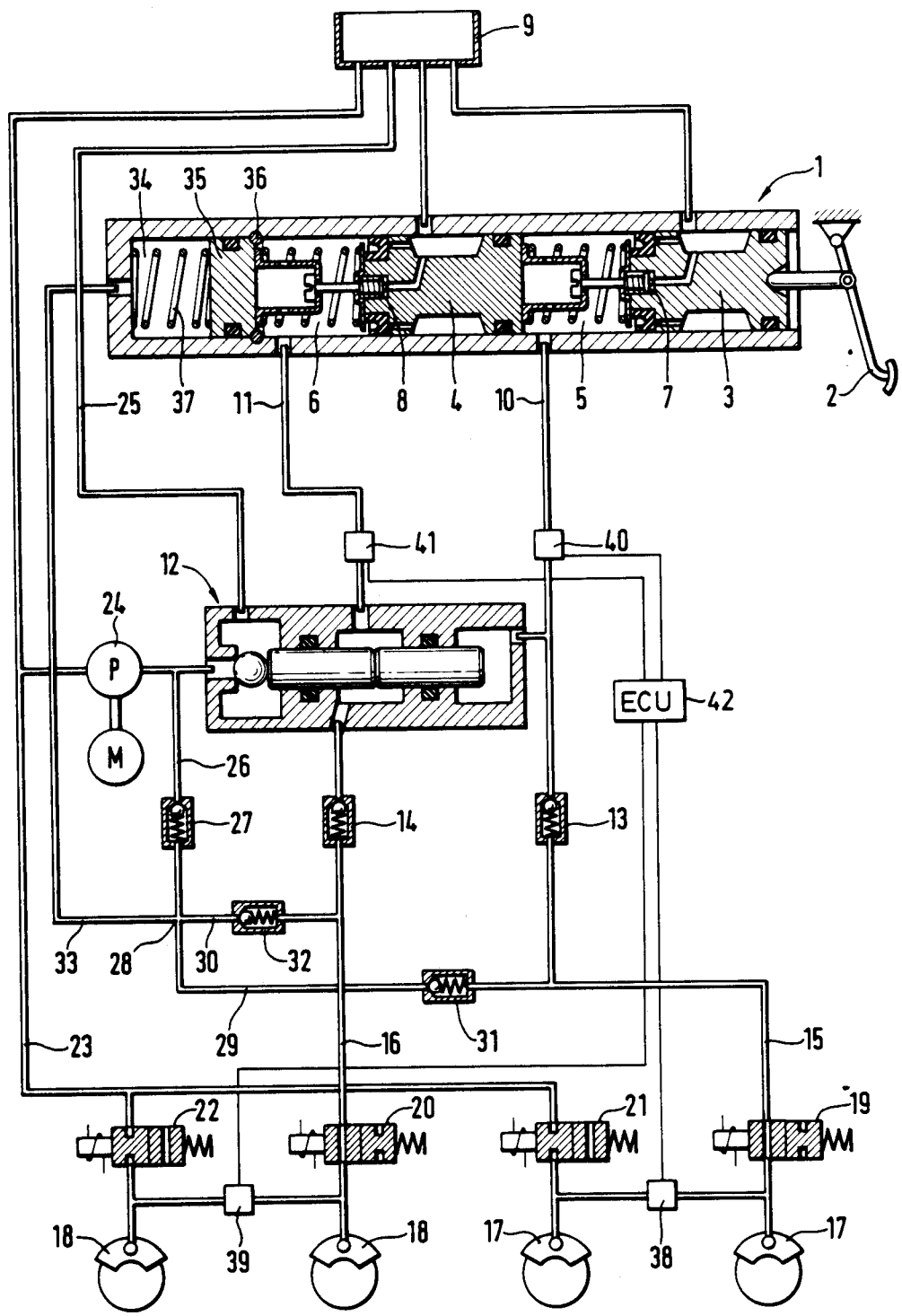

HYDRAULIC BRAKE SYSTEM FOR AUTOMOTIVE VEHICLES

BACKGROUND OF THE INVENTION

The present invention relates to a hydraulic brake system for automotive vehicles of the type comprising a directly operable master brake cylinder, at least one wheel brake in communication with the master brake cylinder, a motor-driven pump capable of being connected to the wheel brake, a brake valve operable by the pressure in the master brake cylinder for controlling the pump pressure, and a brake skid control means comprising a valve arrangement connected ahead of the wheel brake, through which the wheel brake can, alternatingly, be connected to the pump and to a non-pressurized reservoir.

In brake systems of the above-described type, the brake pressure for operating the wheel brakes can be generated through both the master brake cylinder and through a motor-driven pump. The pump pressure is hydraulically controllable in response to the operating pressure in the master brake cylinder. These brake systems are relatively simple in construction as no accumulator or mechanical transmission means between the brake pedal and the brake valve are needed.

In a brake system known from W. German application P No. 35 38 284.8, individual wheel brakes comprise a first and second hydraulic clamping unit. The controlled pump pressure is exclusively applied to the second clamping unit while pressure from a pressure chamber of the master brake cylinder is exclusively applied to the first clamping unit of the wheel brakes. For brake skid controlling, the wheel brakes comprise a hydraulic releasing unit to which the pump pressure is applied by the valve arrangement, in controlled form, to counteract the clamping units. By so dividing the wheel brake applying means into two clamping units and one releasing means, a high operating safety is provided because the brake, upon failure of the energy supply or of the brake skid control, will remain operable through the second clamping unit with the aid of the master brake cylinder. The clamping units and the releasing means on the wheel brakes are piston cylinder systems that are complex in construction and involve relatively high space requirements.

In another brake system of the type described in W. German Patent Application P No. 35 38 284.8, the pressure fluid delivered by a pump is conducted only to partial circuits of the brake system. Hydraulically driven switch-over valves are provided which, upon introduction of the pump pressure, separate the partial circuits from the master brake cylinder and the remaining partial circuits of the brake system. The partial circuits capable of being connected to the pump, also in this brake system, may be in communication with a brake skid control system. The required safety against failure of the energy supply through the pump, or of the brake skid control means, in that brake system, is safeguarded by the partial circuits that are operable only with the aid of the master brake cylinder. This type of brake system exhibits the disadvantage that only the partial circuits to be connected to the pump can be furnished with a brake skid control. Moreover, the operating reliability, in that brake system, to a high degree, is dependent on the proper switching of the switch-over valves.

SUMMARY OF THE INVENTION

It is an object of the invention to provide a hydraulic brake system of the above-described type, wherein all connected wheel brakes are controllable by a brake skid control means, and which is simple in construction and reliable in operation.

In accordance with this invention, the bottom of the master brake cylinder includes a piston separating the master cylinder chamber from a reserve pressure chamber capable of being connected to the outlet of the pump. The piston is precluded, by a fixed stop, from moving into the master cylinder chamber whereby, in the event of a failure of the energy supply in a brake applying phase in which, owing to the preceding brake applying cycle, no adequate pressure fluid volume is available in the master cylinder chamber, the required pressure fluid volume can be displaced from the reserve chamber and fed into the brake system for continuing the brake operation by applying the brake pedal. If the energy supply is intact, the pump pressure is applied to the piston in the reserve chamber to cause the same to be held, in its basic position, in abutment with the fixed stop.

Installing the reserve pressure chamber provides the brake system of the invention with a safe protection against failure of the energy supply or of the brake skid control means. The volume of the reserve pressure chamber can be so dimensioned that it is sufficient for emergency application of all wheel brakes in communication with the master brake cylinder.

To assure that the pressure fluid from the reserve pressure chamber is exclusively fed into the brake system, a check valve is provided between the pump outlet and the connection of the brake system to the reserve pressure chamber for blocking passage toward the pump.

The brake valve, preferably, is designed so that the pump pressure is higher than the master cylinder pressure to thereby attain an increase in the operating force exerted on the brake pedal. To permit generation of a corresponding pressure difference between the master cylinder chamber and the brake system, in the practice of the invention, a check valve blocking the return flow to the master brake cylinder is provided in the outlet of the master brake cylinder leading to the wheel brake; moreover, it is provided that the pressure decrease in the wheel brake is effected by driving the valve arrangement of the brake skid control means. The invention, hence, requires but a simple check valve provided on the master cylinder outlet and, in addition, involves the advantage that the valve arrangement is also driven in standard braking operations and is held in a condition ready for operation.

For driving the valve arrangement, pressure sensors may be provided with the wheel brake and with the master brake cylinder. The measured values of these sensors are detected and compared with one another by a control means which, by a pulsated drive of a pressure relief valve of the valve arrangement, adapts the wheel brake pressure at the boosting ratio predetermined by the brake valve to the pressure in the master brake cylinder. Once the pressure in the master brake cylinder drops by releasing the brake pedal, this will be detected through the pressure sensors, and the pressure relief valve is driven by the control means until the wheel brake pressure is again at the proper ratio to the pressure of the master brake cylinder.

The brake system of the invention may, of course, comprise a variety of brake circuits independent of one another and in communication with separate pressure chambers of a master brake cylinder, with a check valve being provided in the outlet of each pressure chamber. Moreover, each brake circuit, through a check valve closing vis-a-vis the pump, may be in communication with the reserve pressure chamber and the pump outlet, with each brake circuit containing at least one pressure relief valve of the valve arrangement of the brake skid control means. In that case, the master brake cylinder, preferably, is in the form of a tandem master cylinder, with the reserve pressure chamber coupled to the bottom of the tandem master cylinder and, through the piston, separated from the float chamber of the tandem master cylinder.

The piston disposed on the bottom of the master brake cylinder can also be in the form of a stepped piston, the larger step of which faces the reserve pressure chamber while the smaller step thereof faces the master cylinder chamber. Thus, in the layout of the brake system at which the pressures prevailing at the pump outlet and in the master brake cylinder are approximately equal, and the piston cannot be forced against the pump pressure into the reserve pressure chamber. The stand-by position of the piston can, therefore, be overcome only upon failure of the pump pressure.

BRIEF DESCRIPTION OF THE DRAWING

A preferred embodiment of the invention will now be described in more detail with reference to the sole FIGURE of the accompanying drawing which schematically shows a brake system comprising two brake circuits, with the master brake cylinder and the brake valve being shown in longitudinal section.

DETAILED DESCRIPTION OF A PREFERRED EMBODIMENT

The hydraulic brake system comprises a tandem master cylinder 1 actuatable through a brake pedal 2. The brake pedal 2 acts upon a push rod plunger 3 connected to which is a floating plunger 4 subdividing the master cylinder chamber into two pressure or working chambers 5 and 6. Central valves 7, 8 formed in push rod plunger 3 and float plunger 4 are open in the releasing position of the tandem master cylinder so that the working chambers 5, 6 are in communication with a non-pressurized reservoir 9 as shown in the drawing.

Connected to the working chambers 5, 6 of the tandem master cylinder 1 are brake lines 10, 11 leading to separate control chambers of a brake valve 12. Brake lines 15, 16 are connected to the outlets of the check valves 13, 14 and to two groups of wheel brakes 17, 18. Provided in the brake lines 15, 16 ahead of the wheel brakes are electromagnetic valves 19, 20 which valves are open in de-energized condition and controllable by a brake skid control means to block the brake lines 15, 16 during driving. Each group of wheel brakes 17, 18 is connected to the reservoir 9 by a return conduit 23, parallel to the brake lines 15, 16. The return conduit 23 includes magnetic valves 21, 22, de-energized in closed condition, associated with each group of the wheel brakes 17, 18. The electromagnetic valves 21, 22 are also drivable through the brake slip control means thereby causing them to change over from the blocking position, shown in the drawing, into the passage position.

The brake system, moreover, comprises a motor-driven pump 24 discharging pressure fluid from the reservoir 9 through the return conduit 23 and, in the absence of control pressure, delivers the same through the open brake valve 12, a conduit 25 and back to reservoir 9. Ahead of the brake valve 12, a pressure conduit 26 branches from the pump outlet through a check valve 27 to a branch point 28. Connected to the connecting conduits 29, 30, at branch point 28, is the pressure line 26, with the said connecting lines containing check valves 31, 32 and leading to the brake lines 15, 16. Moreover, a pressure line 33, from the branch point 28, leads to a reserve pressure chamber 34 disposed at the bottom of the tandem master cylinder 1 and separated through a plunger 35 from the working chamber 6. The plunger 35 has a diameter that corresponds to that of the float plunger 4 and, in the direction of the working chamber 6, is in abutment with a stop ring 36. The plunger 35 is held against the stop ring 36 by a compression spring 37.

The operation of the brake system will now be described, assuming the brake releasing condition as shown in the drawing.

In the brake releasing position, all conduits and chambers of the brake system are in non-pressurized condition. The wheel brakes 17, 18, through the driven electromagnetic valves 21, 22 and the return conduit 23, are in communication with the reservoir 9. The brake valve 12 is open and the pump 24 actuated by a motor delivers into the reservoir 9 in non-pressurized condition and, hence, almost loss-free. Alternatively, the pump 24 may be at a standstill in the brake releasing position and is actuated only upon commencement of a braking operation. Feasibly, an electric motor actuatable through the stoplight switch may be used as the driving motor for the pump 34.

Through actuation of the brake pedal 2, the push rod plunger 3 and the float plunger 4 are axially displaced to close the central valves 7, 8. At the same time, the electromagnetic valves 21, 22 are caused to take their closed position in that, for example, the movement of or load on the brake pedal is detected by a suitable sensor such as a pedal-operated stoplight switch. Thereupon, pressure is generated in the working chambers 5, 6 which propagates, through the brake conduits 10, 11, to the control chambers of the brake valve 12 and, through the check valves 13, 14 and the brake conduits 15, 16, to the wheel brakes 17, 18. Through this pressure build-up, application of the wheel brakes 17, 18 will be commenced. At the same time, the pressure fluid flow delivered by the pump 24 is restricted such that the pressure on the outlet of the pump 24 increases. The rising pump pressure propagates through the check valve 27 and the pressure line 33 into the reserve pressure chamber 34 where it causes, in cooperation with the compression spring 37, the plunger 35 to remain in abutment with the stop ring 36.

Once the pump pressure has exceeded the pressure prevailing in the brake lines 15, 16, the check valves 31, 32 open. The continued pressure rise in the brake lines 15, 16 and the wheel brakes 17, 18 connected thereto is then attained through the pressure fluid delivery of pump 24, whereas the actuation of the tandem master cylinder 1 only causes the control of the brake valve 12. Depending on the layout of the brake valve 12, the pump pressure can be a multiple of the master cylinder pressure such that the brake system as described already with the usual brake application provides a brake force boosting by which substantial actuating comfort is attainable.

In the event that the pressure in the tandem master cylinder is decreased, the pressure on the pump outlet equally decreases at the corresponding transmission ratio predetermined by the brake valve 12. However, no pressure decrease is attainable in this manner in the brake lines 15, 16 or on the wheel brakes 17, 18, as a return flow of the pressure fluid to the master brake cylinder or to the pump outlet is precluded by the check valves 13, 14 and 31, 32. To obtain the pressure decrease on the wheel brakes 17, 18, pressure sensors 38, 39 are provided on the wheel brakes 17, 18, while pressure sensors 40, 41 are provided on the brake conduits 10, 11. The pressure values measured by the pressure sensors 38 to 41 and transmitted as electrical variables to the brake skid control means are compared with one another by the brake skid control means ECU 42. Once the pressure difference between the wheel brake pressure and the master cylinder pressure exceeds the value determined by the transmission ratio of the brake valve, the electromagnetic valves 21, 22 will be pulsatedly driven by the brake skid control means until the pressure on the wheel brakes 17, 18 has decreased to the required value determined by the pressure in the tandem master cylinder. Once the brake pedal is completely released and the master cylinder pressure, accordingly, decreased completely, the electromagnetic valves 21, 22 are caused to take their open position in which they are held until the brake is re-applied.

In the event that, during a brake application, the pressure fluid supply through the pump 24 should fail, a further brake pressure increase in the brake conduits 15, 16 could alone be attained through operation of the tandem master cylinder 1. In that case, the pressure in the working chambers 5, 6 of the reserve pressure chamber 34 and the wheel brakes 17, 18 is respectively equal.

As the piston 35 is no longer held on the stop ring 36 through an elevated pressure, the volume of the reserve pressure chamber will be available for filling the brake system. The missing volumetric delivery of the pump 24 can be supplied to the wheel brakes by a more extended brake pedal travel through the reserve pressure chamber of the tandem master cylinder.

Once the brake skid control system detects a locking tendency of a wheel brake 17, 18, the electromagnetic valves 19–22 are intermittently controlled to secure optimum deceleration by an intermittent pressure increase and pressure decrease in accordance with the variables of the brake skid control means. It is also in an actuating phase of this type that the reserve pressure chamber 34 provides protection for the brake system against complete failure, as in case of failure of the pressure fluid supply through the pump 24. On such a failure, the piston 35 is actuated with the aid of the brake pedal 2 to thereby permit an adequate amount of pressure fluid to be displaced from the reserve pressure chamber 34 into the brake conduits 15, 16.

As also shown by the foregoing description, the brake system of this invention is simple in construction and provides adequate safety against failure of the pressure fluid supply. No special restoring unit is required for restoring the pistons of the tandem master cylinder into a safety position upon commencement of the brake skid control, thereby equally providing enhanced operating comfort. Moreover, control of the pressure drop with the aid of the electromagnetic valves 21, 22 will monitor the operating readiness thereof.

Driving of the electromagnetic valves 21, 22 need not be permanent with a released brake; it is rather possible for the electromagnetic valves 21, 22 to be driven only temporarily at regular intervals to permit a pressure compensation, and, incidentally, to take their de-energized closing position. Sustained loading of the electromagnets is thus avoided.

What is claimed is:

1. A hydraulic brake system for automotive vehicles, said system comprising a master brake cylinder directly operable by a brake pedal, at least one wheel brake in communication with the master brake cylinder, a motor-driven pump capable of being connected or disconnected to the wheel brake, a brake valve for controlling the pump pressure, the brake valve being operable by pressure in the master brake cylinder, a brake skid control means comprising a valve arrangement coupled ahead of the wheel brake, said valve arrangement being operative so that the wheel brake can be connected to the pump or to a nonpressurized reservoir, wherein the pressure decrease in the wheel brake is effected by driving the valve arrangement, a bottom end of the master brake cylinder including a piston separating the master cylinder chamber from a reserve pressure chamber, means for connecting or disconnecting the reserve pressure chamber to the outlet of the pump, a fixed stop in said master cylinder for precluding the piston from moving into the master cylinder chamber, a check valve which blocks the return flow to the master brake cylinder, said check valve being provided in the outlet of the master brake cylinder leading to the wheel brake, pressure sensors for sensing pressure in the wheel brake and on the outlet of the master brake cylinder, and a control means provided to detect and compare the pressure values measured by the sensors and for pulsatedly driving a pressure relief valve of the valve arrangement to adapt the wheel brake pressure to the master cylinder pressure at a ratio predetermined by the brake valve.

* * * * *